April 30, 1963 R. F. SMITH 3,087,849

FLUID FILTERING DEVICE

Filed Aug. 4, 1959

INVENTOR.
RUSSELL F. SMITH
BY
Charles H. Bassett
ATTORNEY

United States Patent Office 3,087,849
Patented Apr. 30, 1963

3,087,849
FLUID FILTERING DEVICE
Russell F. Smith, Ferguson, Mo., assignor to ACF Industries, Incorporated, New York, N.Y., a corporation of New Jersey
Filed Aug. 4, 1959, Ser. No. 831,512
1 Claim. (Cl. 156—307)

This invention relates to filtering devices for separating foreign matter from fluids and, more particularly, to a filtering device adapted for use in a fuel system for an internal combustion engine for removing such foreign material as might deleteriously affect the operation of the engine or a carburetor associated therewith.

An object of the invention resides in the provision of a filtering device particularly adapted for use in fuel systems for small internal combustion engines of the type employed to drive small automobiles, lawn mowers, chain saws, etc.

Another object of the invention resides in the provision of a filter device in which a filter element is clamped between a pair of generally cup-shape housing members having their rim portions in telescopic leakproof sealing engagement.

A further object of the invention resides in the provision of housing members formed of thermoplastic material and provided with annular ribs for circular line contact sealing engagement against opposite sides of the filter element to prevent fluid from by-passing the filter element.

Another object of the invention resides in the provision of transparent cup-shaped housing members formed of nylon and provided with circular ribs for engagement with opposite sides of a ceramic filter element. During assembly, the ribs and the telescopically engaged portions of the members are coated with carbolic acid which acts to bond the members to each other and to the filter element.

Another object of the invention resides in the provision of a filter device in which a paper filter of generally cylindrical form is clamped between a pair of cup-shaped housing members.

Another object is to provide a filter device in which one of a pair of cup-shaped housing members is provided a fuel control valve.

The invention embodies other novel features, details of construction and arrangement of parts which are hereinafter set forth in the specification and claim and illustrated in the accompanying drawings, forming part thereof, wherein:

Figure 1:
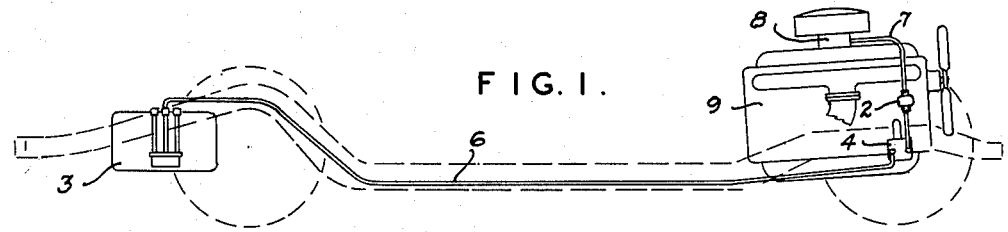
FIG. 1 is a schematic view of an internal combustion engine fuel system provided with a fuel filtering device embodying features of the invention.
Figure 3:
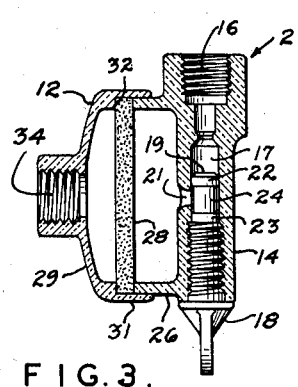
Figure 2:
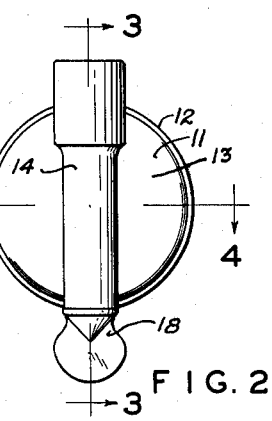
FIG. 2 is an end elevation of the filter device.
Figure 4:
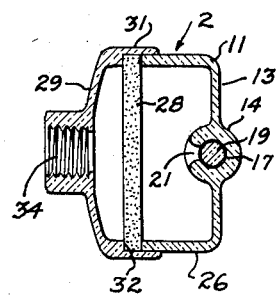

FIGS. 3 and 4 are sections taken along the lines 3—3 and 4—4, respectively, of FIG. 2.

Figure 5:
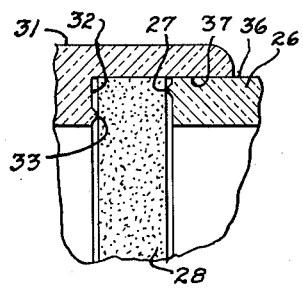
Figure 6:
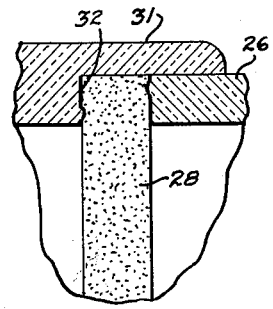

FIGS. 5 and 6 are enlarged fragmentary sections illustrating the manner in which the filter element is clamped in leakproof engagement between the housing members during assembly of the filter device.

Figure 7:
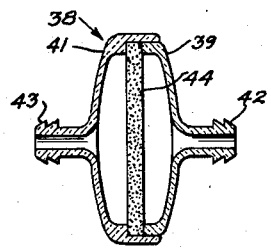

FIG. 7 is a section corresponding to FIG. 3 illustrating a modified form of the invention.

Figure 8:
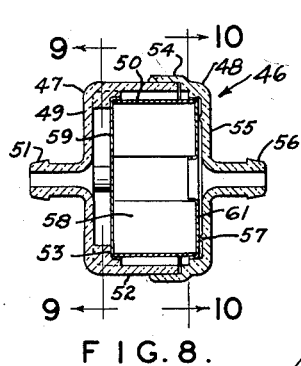

FIG. 8 is a section corresponding to FIG. 3 illustrating another embodiment of the invention.

Figure 9:
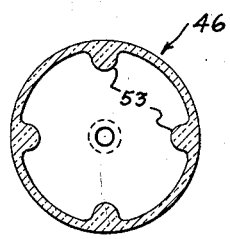
Figure 10:
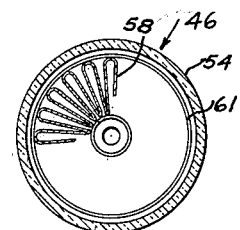

FIGS. 9 and 10 are sections taken along the lines 9—9 and 10—10, respectively, of FIG. 8.

Referring now to the drawings for a better understanding of the invention and more particularly to FIGS. 1 to 6 therein, the filter device 2 is shown as incorporated in an automobile fuel system comprising a fuel tank 3 connected to the intake side of a fuel pump 4 by a conduit 6. A conduit 7 extends from the pump discharge outlet to a carburetor 8 mounted on an internal combustion engine 9. The filter device 2 is interposed in the conduit 7 to separate foreign material from the fuel.

The filter device 2 is shown as comprising a pair of cup-shaped housing members 11 and 12 which are preferably formed of a gasoline resistant, transparent thermoplastic material, such as nylon. The housing member 11 is formed with a circular bottom 13 having a central rib 14 extending beyond diametrically opposed sides thereof. One end of the rib 14 is formed with a fluid inlet passage 16 in communication with a valve chamber 17; and the other end of the rib is formed with a threaded opening to receive an externally threaded fuel control screw 18 having a valve portion 19 on its inner end for axial movement within the valve chamber 17 for opening or closing a port 21 in the bottom 13.

The valve portion 19 must be in snug slidable engagement with the cylindrical wall of the valve chamber 17 to prevent leakage of fuel from the inlet passage 16 through the valve chamber and port 21 when the valve portion is in its closed position. To reduce frictional resistance to movement of the screw 18, the valve portion 19 is formed with spaced cylindrical sealing portions 22 and 23 interconnected by a neck portion 24 of relatively smaller diameter.

A cylindrical side wall 26 extends outwardly from the base 13 and is formed with a circular rib 27 (FIG. 5) for line contact sealing engagement against one side of a disk-shaped ceramic filter element 28. The housing member 12 is shown as comprising a concavo-convex bottom 29, and a cylindrical side wall 31 having an annular abutment shoulder 32 formed with a circular rib 33 for line contact sealing engagement against one side of the filter element 28. A fuel outlet 34 is provided in the bottom 29.

The outer surface 36 of the side wall 26 and the inner surface 37 of the side wall 31 are formed for snug telescopic engagement during assembly of the filter device. To assemble a filter device comprising nylon housing members, the ribs 27 and 33 and the surfaces 36 and 37 may be coated with carbolic acid which acts to soften said ribs and surfaces. The housing members are then telescopically engaged to clamp the filter element 28 therebetween and to cause the softened ribs 28 and 33 to conform to the contour of and to become embedded in the porous sides of the filter element, as illustrated in FIG. 6. Within a short period of time, the nylon material adjacent the surfaces 36 and 37 gradually returns to its normal hard condition and causes said surfaces to be bonded together.

FIG. 7 illustrates a modified form of the invention wherein the filter device 38 is shown as comprising a pair of cup-shaped housing members 39 and 41 having axially aligned inlet and outlet nozzles 42 and 43, respectively, for detachable connection to fuel line conduits 6 and 7. The housing members are otherwise formed and assembled to clamp a filter element 44 therebetween as heretofore shown and described.

FIGS. 8, 9 and 10 illustrate another embodiment of the invention wherein the filter device 46 is shown as comprising cup-shaped housing members 47 and 48 formed of a suitable gasoline resistant thermoplastic material, such as nylon. The housing member 47 comprises a bottom 49 having an inlet nozzle 51, and a cylindrical side wall 52 having internal circumferentially spaced abutment bosses 53 for engagement against a filter element 50.

The housing member 48 comprises a cylindrical side wall 54 and a bottom 55 having an outlet nozzle 56, and an annular internal rib 57 for line contact sealing engagement against the filter element 50. The filter element comprises a strip of paper 58, pleated as illustrated in FIG. 10, and adhesively united along its edges to thin metal flanged caps 59 and 61.

During assembly, the filter element 50 is clamped between the bosses 53 and the annular rib 57. The telescopically engaged surfaces of the side walls 52 and 54, and the rib 57, are coated with carbolic acid, prior to assembly, to bond the housing members together and to insure a leakproof sealing engagement between the rib and the cap 61.

Certain structures have been described herein which will fulfill all the objects of the present invention, but it is contemplated that other modifications will be obvious to those skilled in the art which come within the scope of the invention as defined by the appended claim.

I claim:

In a method of combining the structural elements of a filter assembly, the structural elements of the filter assembly including a pair of cup-shaped housing members of thermoplastic material with an inlet and an outlet provided therefor, each housing member to include a bottom and a cylindrical side wall, one of the side walls to include an annular inwardly extending abutment spaced from its outer marginal edge and enclosing in close telescopic engagement the other side wall, with the marginal edge of the latter in spaced relation to the abutment, whereby said abutment and the marginal edge of the other housing member provide oppositely facing seating surfaces between which is positioned a ceramic annular filter element and the seating surfaces each further including an outwardly projecting annular rib with the annulus of one of the ribs of greater diameter than the diameter of the other rib so that said ribs are laterally spaced with respect to one another for engaging spaced areas on opposite marginal faces of the ceramic filter, the method consisting in applying a solvent to the seating surfaces of the cup-shaped members, the projecting ribs and the adjacent inner surface of the outer cylindrical side wall between the seating surfaces to temporarily soften these surfaces, clamping the parts together with the housing members telescoped and the ceramic filter element therebetween to imbed the softened ribs into the adjacent surfaces of the filter element to provide a bond therebetween and to further provide a seal between the adjacent portions of the cup-shaped housing members and the ceramic filter element as the ribs conform to the ceramic filter element surface, whereby the entire marginal portion of the ceramic filter element is sealed and bonded to the housing sections to permanently hold the parts in fixed sealed relation.

References Cited in the file of this patent

UNITED STATES PATENTS

| | | |
|---|---|---|
| 1,139,331 | Boulard | May 11, 1915 |
| 1,612,526 | Mueller | Dec. 28, 1926 |
| 2,202,403 | Sandberg | May 28, 1940 |
| 2,274,113 | White | Feb. 24, 1942 |
| 2,288,532 | Knapp | June 30, 1942 |
| 2,354,481 | Russell | July 25, 1944 |
| 2,525,287 | Cuno | Oct. 10, 1950 |
| 2,584,206 | Hodsdon | Feb. 5, 1952 |
| 2,683,536 | Kasten | July 13, 1954 |
| 2,776,055 | Adler | Jan. 1, 1957 |
| 2,879,207 | Poitras | Mar. 24, 1959 |

FOREIGN PATENTS

| | | |
|---|---|---|
| 958,467 | Germany | Feb. 21, 1957 |